United States Patent [19]

Rosa

[11] 4,129,809

[45] Dec. 12, 1978

[54] POWER FACTOR CORRECTED DUAL CONVERTER MOTOR DRIVE

[75] Inventor: John Rosa, Penn Hills, Pa.

[73] Assignee: Westinghouse Electric Corp., Pittsburgh, Pa.

[21] Appl. No.: 791,746

[22] Filed: Apr. 28, 1977

[51] Int. Cl.² ............................................. H02P 7/00
[52] U.S. Cl. .................................... 318/293; 363/161
[58] Field of Search ............... 318/293, 345 R, 345 F, 318/345 G, 345 H; 363/161

[56] References Cited

U.S. PATENT DOCUMENTS

| 3,959,719 | 5/1976 | Espelage | 363/161 X |
| 3,984,741 | 10/1976 | Kind | 318/293 |
| 4,013,937 | 3/1977 | Pelly et al. | 363/161 X |

Primary Examiner—William M. Shoop
Attorney, Agent, or Firm—C. M. Lorin

[57] ABSTRACT

A dual converter for use in a static direct current motor drive is operated with circulating current and the circulating current is adjusted by firing angle control to automatically maintain reactive power compensation during varying torque and speed conditions of the load.

6 Claims, 15 Drawing Figures

SEPARATE CONTROL OF OUTPUT VOLTAGE V
AND CIRCULATING CURRENT $I_C$

POWER FACTOR CORRECTED DUAL CONVERTER MOTOR DRIVE

BACKGROUND OF THE INVENTION

The present invention relates in general to power factor correction for minimizing the adverse effects of an inductive load on an alternating current power supply, and more particularly, to a static direct current motor drive of improved power factor.

It is well known that an output regulated AC to DC converter can impair the factor of the AC power supply drawn therefrom. This is especially true of a DC motor drive which is required to be stopped and started repeatedly during operation and that must be forced to reverse its speed quite often. These are common requirements with hoists and cranes. Therefore, it is desirable to have a DC motor drive in which power factor correction is automatically effected during such varying operative conditions.

One particularly desirable type of motor drive is the dual converter because it lends itself to direct current motor control in either direction, and regenerative braking is inherently provided with equal ease for each direction of rotation. The dual converter has also the advantages of any static motor drives which include power efficiency, capability for solid state modular assembly, superior maintainability a high speed in control and flexibility due to the use of a control logic. The dual converter has been described in chapter 5, pages 111–144 of the book by B. R. Pelly, entitled "Thyristor Phase-Controlled Converters and Cycloconverters" edited by John Wiley & Sons in 1971.

As explained on page 127 of this book by B. R. Pelly, when reversal of load current is required, the dual converter can be operated with a circulating current rather than in a circulating current-free mode. This is achieved by connecting a current-limiting reactor between the DC terminals of the two converters forming the dual converter and by regulating the firing angles of the individual converters in such a way that a controlled amount of current is allowed to circulate between them. By so doing, the two individual converters can be in continuous conduction over the whole control range.

In a quite different context, it has been shown by B. R. Pelly and L. Gyugyi in U.S. Pat. No. 4,013,937, issued Mar. 22, 1977 that a naturally commutated static frequency changer coupled to an alternating current power supply may become a controllable static reactive power generator under proper control of a circulating current between opposite banks of static switches.

It is also known from U.S. Pat. No. 4,001,670 of L. Gyugyi, John Rosa and E. J. Stacey, issued Jan. 4, 1977 to connect a fixed capacitor at the input of an unrestricted or of a naturally commutated frequency changer to extend the reactive power range of control available against the alternating current power supply.

Converters which operate over a wide range of firing angles (such as those supplying armature power in variable speed DC motor drives) draw widely varying lagging reactive power from the AC lines. In certain applications (such as large shovels operating from long transmission cables), good compensation of the varying reactive power is required. Because of the wide variation of reactive power, compensation with permanently connected capacitor is not feasible. Switching of capacitors is generally not practical because of the arduous duty of the circuit breakers which are required to operate rather frequently.

An object of the present invention is to provide an improved AC supplied direct current motor drive which can be maintained automatically at a power factor of substantially unity.

Another object of the present invention is to provide a dual converter mounted as a static direct current motor drive between an alternating current power supply and at least one direct current motor, in which the dual converter is automatically controlled to compensate for the inductive load.

Still another object of the present invention is an AC powered hoist system of improved characteristics.

SUMMARY OF THE INVENTION

In a dual converter connected between an alternating current power source and a direct current load including at least one positive and one negative bank of semiconductor controlled rectifiers connected in opposition between two opposite terminals of said direct current load, one of said banks being operated as a rectifier under said power source, the other of said banks being operated as an inverter from said load to said source, the combination of: capacitor means connected to said power source for generating a reference leading quadrature current; signal means for sensing a condition representative of a lagging quadrature current in said dual converter; means responsive to the difference between said leading quadrature current and said lagging quadrature current; and operative on said banks to generate a circulating current therebetween to minimize said difference.

DETAILED DESCRIPTION OF THE INVENTION

Figure 1:
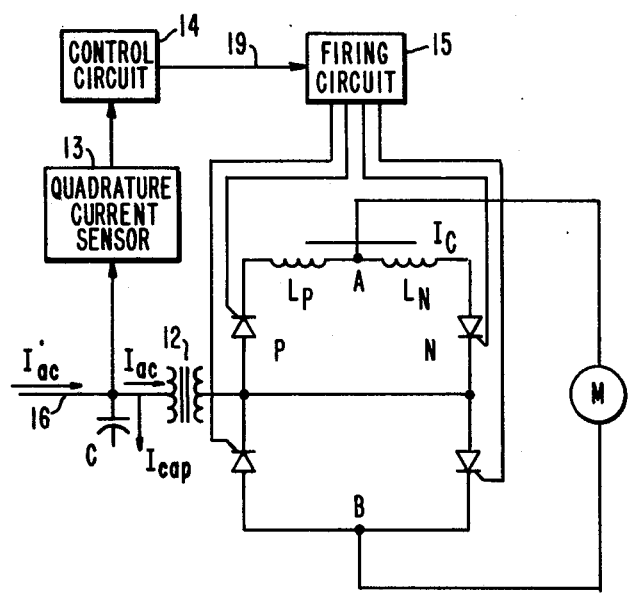
FIG. 1 is a block diagram of the controlled dual converter according to the invention.

FIG. 1 typically shows a dual converter connected between a power transformer 12 and a DC motor M. The transformer 12 has a three-phase primary connected via line 16 to the three-phase alternating current power supply. The secondary is connected via lines 10 to the thyristor junction points of two banks of thyristors P and N of the dual converter. The terminals A, B of the dual converter are connected to the armature of motor M. The VAR reactive power on the primary side of the transformer is sensed and detected by a VAR sensor 13. A VAR control circuit 14 responsive to VAR sensor 13 determines the firing angle for the thyristor of the two converters P, N, through a firing circuit 15. A fixed capacitor C is mounted with the three-phase lines 16 at the entry of the primary of transformer 12, e.g., three capacitors of ⅓C mounted in delta, or of C mounted in between the three lines 16, introduce additional reactive power in parallel to the dual converter.

The DC output voltage of thyristor converters P and N is controlled by means of controlling the firing angle $\alpha$:

$$V_{dc} = V_{dc\ max} \cos\alpha$$

where $V_{dc\ max}$ is the largest obtainable ($\alpha=0$) DC voltage at terminals AB for a given AC line voltage and circuit configuration.

The invention will be more clearly understood from a consideration of the remaining figures.

Figure 2A:
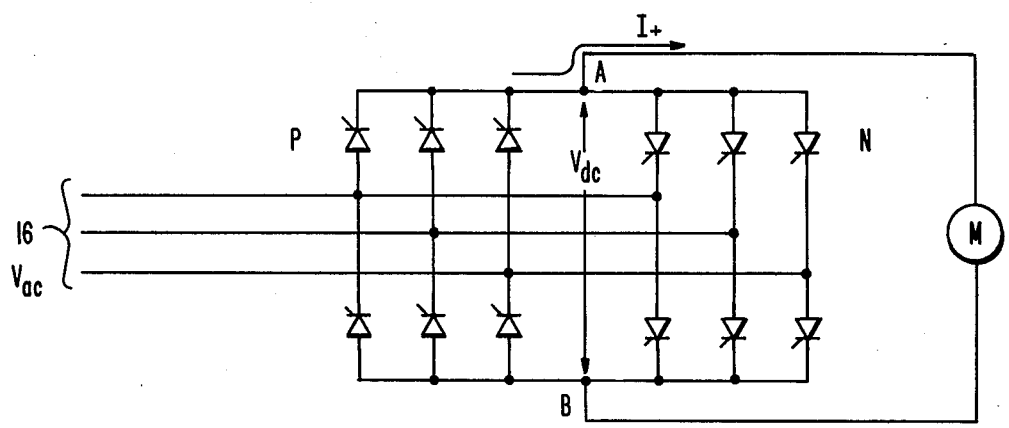
FIGS. 2A, 2B are illustrative of two respective opposite modes of operation of a dual converter according to the prior art, without circulating current.
Figure 2B:
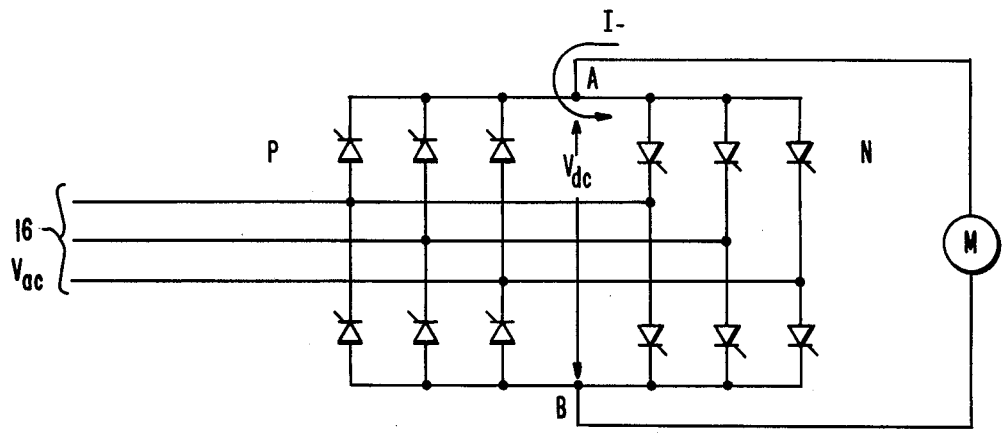

FIGS. 2A and 2B show a conventional thyristor dual converter as can be used for reversible motor drives. As generally known, dual converters are usually operated in the manner shown in FIGS. 2A and 2B. When the motor M requires a positive armature current $I_+$, the "positive converter" P is gated at the required firing angle $\alpha_P$ while gate pulses to the thyristors of the "negative converter" N are suppressed and the negative converter is not conducting. When the motor requires a negative armature current $I_-$, it is supplied by the negative converter N fired at the required $\alpha_N$ angle, while P is not conducting.

Figure 3:
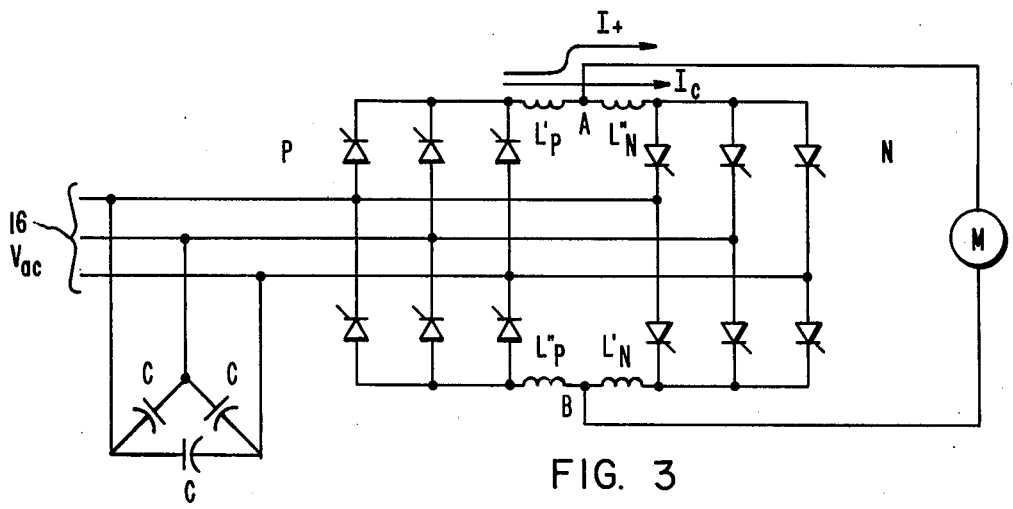
FIG. 3 shows in diagrammatic form a dual converter operating in the circulating current mode.

Instead of one thyristor bank being operative at a time, it is possible to operate the two converters in such a manner that they are both simultaneously gated and allow a circulating current. FIG. 3 illustrates the case when the motor requires positive current $I_+$, which is supplied by positive converter P. An additional current $I_c$ is circulated between the positive (P) and negative (N) converter. In order to accomplish this, reactors $L_1$, $L'_1$ and $L_2$, $L'_2$ are provided and the average DC output voltages $V_{dcP}$, $V_{dcN}$ of the two converters must be held equal in magnitude but opposite in polarity (a negligible voltage difference is necessary to compensate for the DC voltage drop across reactors $L_1$, $L'_1$ and $L_2$, $L'_2$, respectively, the function of which is to support the ripple difference between $V_{dcP}$ and $V_{dcN}$). Consequently, the firing angles $\alpha_P$ and $\alpha_N$ of the two converters are supplementary angles ($\cos\alpha_N = -\cos\alpha_P$ and $\alpha_N = 180° - \alpha_P$).

An inherent characteristic of such converters is that for a given firing angle $\alpha$, the displacement angle of the AC input current is also $\alpha$.

Figure 4:
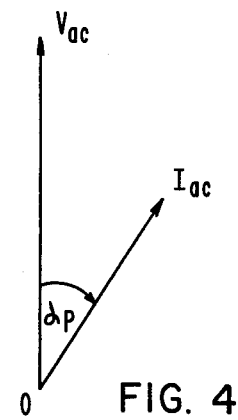
FIGS. 4 and 5 show the vectorial relation of the line current with a motor fed by a static converter operated in motoring and braking modes, respectively.

The phase relationship of the fundamental component of the AC line current $I_{ac}$ with respect to the line-to-neutral AC voltage $V_{ac}$ corresponding to a motoring (consuming) load on the positive converter is shown in FIG. 4. The displacement angle $\alpha_P$ is identical to the firing delay angle of the converter. The phase relationship for a braking (regenerating) load on the negative converter is shown in FIG. 5.

Figure 5:
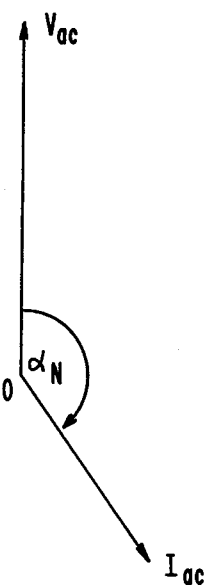
Figure 6:
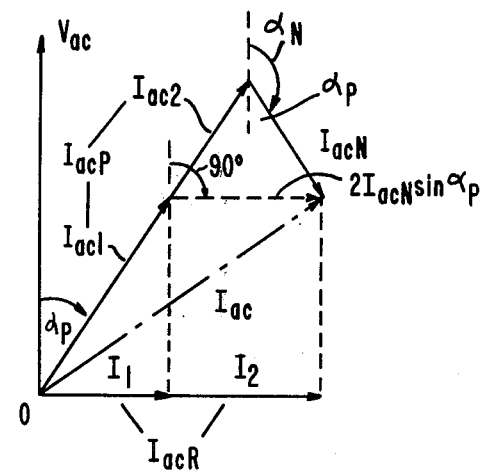
FIG. 6 shows vectorially the phase relationship of the converter line currents with a motor fed by a dual converter and a composition of vectors revealing the components of lagging quadrature currents there involved.

The phase relationship of the fundamental AC line currents of the dual converter of FIG. 5 is shown in FIG. 6. The line current $I_{acP}$ drawn by the positive converter P has two components: $I_{ac1}$ which is proportional to $I_+$ and $I_{ac2}$ which is proportional to $I_c$. Both currents have a displacement angle $\alpha_p$. The line current $I_{acN}$ associated with the negative converter N is proportional to $I_c$ (and thus has the same amplitude as $I_{ac2}$), but has a displacement angle $\alpha_N = 180° - \alpha_P$. The component of the AC line current corresponding to the circulating current $I_c$ is the vectorial sum of $I_{ac2}$ and $I_{acN}$. It can be seen that this current has a 90° displacement angle and an amplitude which is: $2I_{acN} \sin p$. The reactive part $I_{acR}$ of the net fundamental AC line current $I_{ac}$ has two components:

$$I_{acR} = I_{ac1} \sin\alpha_P + 2I_{acN} \sin\alpha_P$$

Since $I_{ac1} = k_I I_+$, and $I_{acN} = k_I I_c$, (where $k_I$ is a design constant defined by the particular connections, $$I_{acR} = K_I(I_+ + 2I_c) \sin\alpha_P \qquad (1)$$

Figure 7:
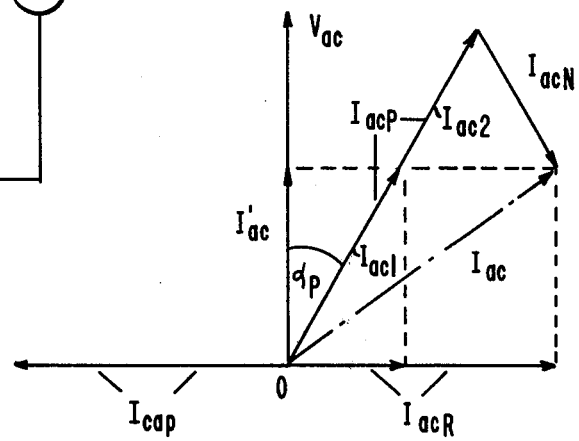
FIG. 7 is analogous to FIG. 6, but in a situation in which a leading quadrature component of fixed magnitude is provided by fixed capacitors.

An identical expression is obtained when a load current $I_-$ is drawn from the negative converter, except that symbols $I_-$ and $\sin\alpha_N$ replace symbols $I_+$ and $\sin\alpha_p$ in equation (1). From FIG. 7 and Equation (1) it appears that the reactive (lagging) part of the net AC line current $I_{acR}$ is made up of a load dependent component $I_1$ and a component $I_2$ which can be controlled independently by merely controlling the circulating current $I_c$, where $$I_1 + I_2 = I_{acR}$$

Figure 8:
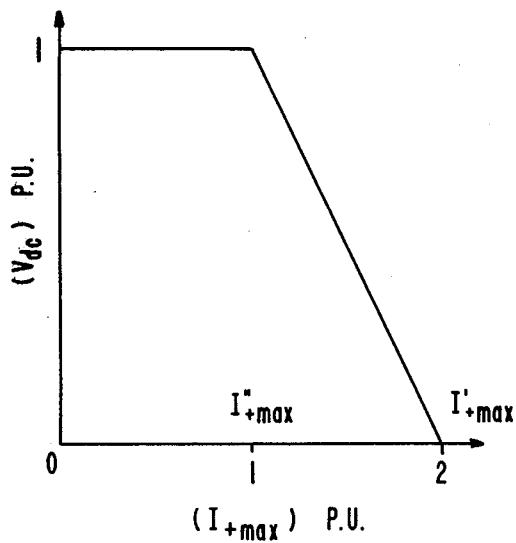
FIG. 8 is a diagram showing the P.U. required for a dual converter according to the invention for minimum and for maximum direct current voltage at the terminals.

Since the quadrature current $I_{acR}$ is always lagging at least to the extent of component $I_1$, caused by the motor current, a fixed leading quadrature component $I_{cap}$ (FIG. 7) is provided at the primary of the converter transformer by connecting fixed capacitors C, as shown in FIG. 8. Provided $I_{cap}$ is equal to or larger than the largest value of $I_1$, it is clear that by changing the value of $I_2$ it will be possible to keep $I_1 + I_2$ equal and opposite in magnitude to $I_{cap}$, and therefore, as seen from the power supply, to maintain a unity power factor.

Thus, fixed capacitors C are permanently connected in delta, or Y connection, between the AC lines feeding the dual converter and a fixed leading current $I_{cap}$ is thereby drawn. The current $I_c$ circulating between the positive and negative converters is controlled to adjust $I_2$ in such a manner that the lagging component $I_{acR}$ of the net converter AC line current $I_{ac}$ cancels $I_{cap}$.

$$I_c = \frac{1}{2} \left( \frac{NI_{cap}}{k_I \sin\alpha_P} - I_+ \right)$$

where N is the converter transformer turns ratio. As a result, the current $I_{ac}'$ drawn from the AC lines has zero displacement angle and the system operates at unity displacement factor. Indeed, the capacitor C must be of such size as to draw $NI_{cap} = k_I I_{+max}'$, i.e., the largest expected lagging AC line current with no circulating current, at $V_{dc} = 0$.

The rectification and inversion end stop settings determine the circulating current necessary for cancellation of $I_{cap}$ at maximum $V_{dc}$ and zero load current. The corresponding maximum circulating current is:

$$I_{c\,max} = \frac{NI_{cap}}{2k_I \sin\alpha_{P\,min}} = \frac{I'_{+\,max}}{2 \sin\alpha_{P\,min}}$$

The rating of the converters is so chosen as to deliver the worst possible combination of load and circulating current that can occur when $V_{dc} = V_{dc\,max}$ and $I_+ = I_{+\,max}''$. The minimum load current at $V_{dc\,max}$ is generally less than, or at most equal to, the load current at $V_{dc} = 0$. Therefore:

$$I_{conv\,max} = \frac{1}{2} \left( \frac{I'_{+\,max}}{\sin\alpha_{P\,min}} + I''_{+\,max} \right) \quad (2)$$

In a specific example using equation (2), if the maximum load current requires 2 P.U. at $V_{dc} = 0$ and requires 1 P.U. at $V_{dc\,max}$, (see FIG. 8), for rectification and inversion end stops set at 30°, the following obtains:

$$I_{conv\,max} = \frac{1}{2} \left( \frac{2}{.5} + 1 \right) = 2.5 \text{ P.U.}$$

Figure 9:
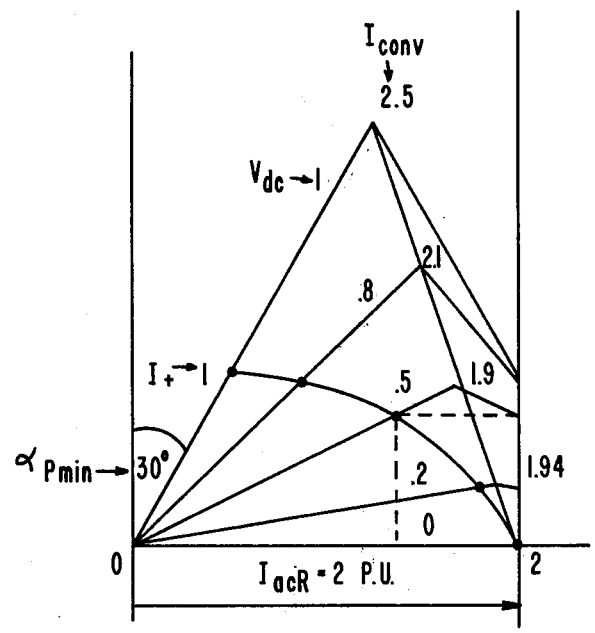
FIG. 9 graphically shows the converter current for different intermediary values of the direct current voltage at the terminals of the dual converter according to the invention.

This shows in the example that an increase of 25% is necessary from the assumed 2 P.U. rating required with no circulating current. The increase in tranformer, and thyristor voltage rating to facilitate the proposed operation is $$\left( \frac{\cos 0°}{\cos 30°} - 1 \right) \times 100 = 15\%,$$

assuming that, without circulating current, $\alpha_{P\,min}$ could be set at 0°. FIG. 9 is a graphic representing converter currents for different values of $V_{dc}$.

The converter DC current rating and the transformer and thyristor voltage ratings can be traded off against each other. Thus, in the given example with the rectification end stop set to $\alpha_{P\,min} = 42°$, no increase in DC current rating is required, but the transformer and thyristor voltage ratings have to be increased by $$\left( \frac{\cos 0°}{\cos 42°} - 1 \right) \times 100 = 35\%.$$

It should be noted that a similar increase will occur in the transformer turns ratio and, correspondingly, the capacitor current $I_{cap}$ is increased. Thus the required capacitor K VAR rating is increased.

However, this is a minor price to be paid for an effective, powerful, and reliable DC motor drive that is capable of operation over a wide range of firing angles, with good compensation of extremely varying lagging reactive power as required for industrial applications such as large shovels supplied locally from long transmission cables.

Figure 10:
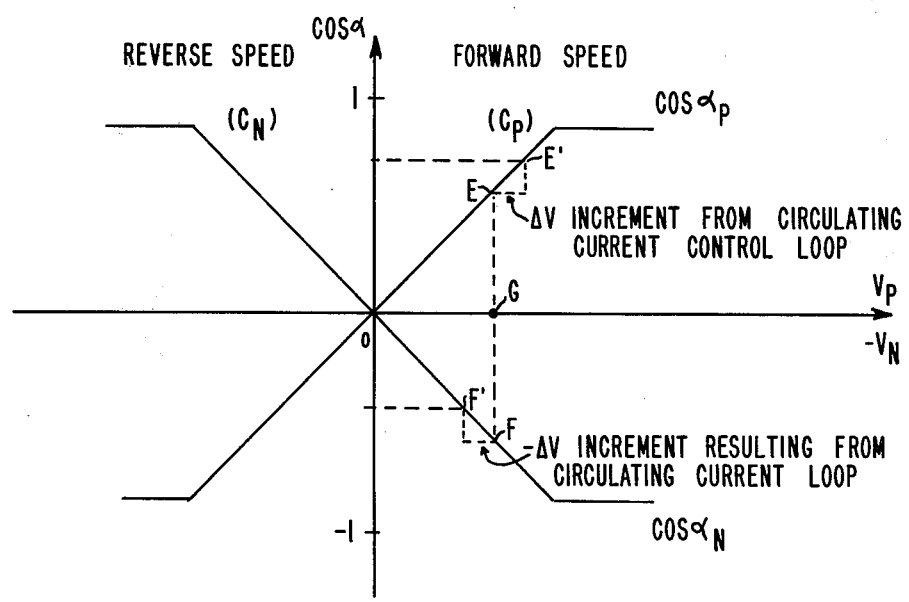
FIG. 10 shows two linear characteristics defining the firing agents of the two individual opposite converters during control of the dual converter at forward and at reverse feed of the load.

Referring to FIG. 10, the principle of control of the two converters P and N is illustrated by response characteristics $(C_P)$ and $(C_N)$ representing $\cos\alpha_P$ and $\cos\alpha_N$ assuming a linear function of $(V_P)$ and $(-V_N)$. These two curves are a mirror image of one another. In the absence of circulating current $(I_C = 0)$, each converter is exhibiting between the DC terminals (A and B on FIG. 1) the same average voltage in absolute value, $|V_P| = |V_N|$, therefore the operating points E for converter P and F for converter N are on the same abscissa G. The positive values of the horizontal axis are for one direction of rotation, the negative values correspond to reverse speed. The characteristics $(C_P)$ and $(C_N)$ end up short of the theoretical maximum angles of 0° and 180° due to the end stops, which in the example earlier given are at 30° and 150°, respectively.

When there is control, according to the present invention, a circulating current $I_C$ is caused to pass between the converters which results from an asymmetry in firing angles between the two converters. The new operative points become E' and F', shifted in opposite directions due to an increment $\Delta V$ in $V_P$ and $V_N$ each caused by the feedback loop which determines the circulating current.

Figure 11:
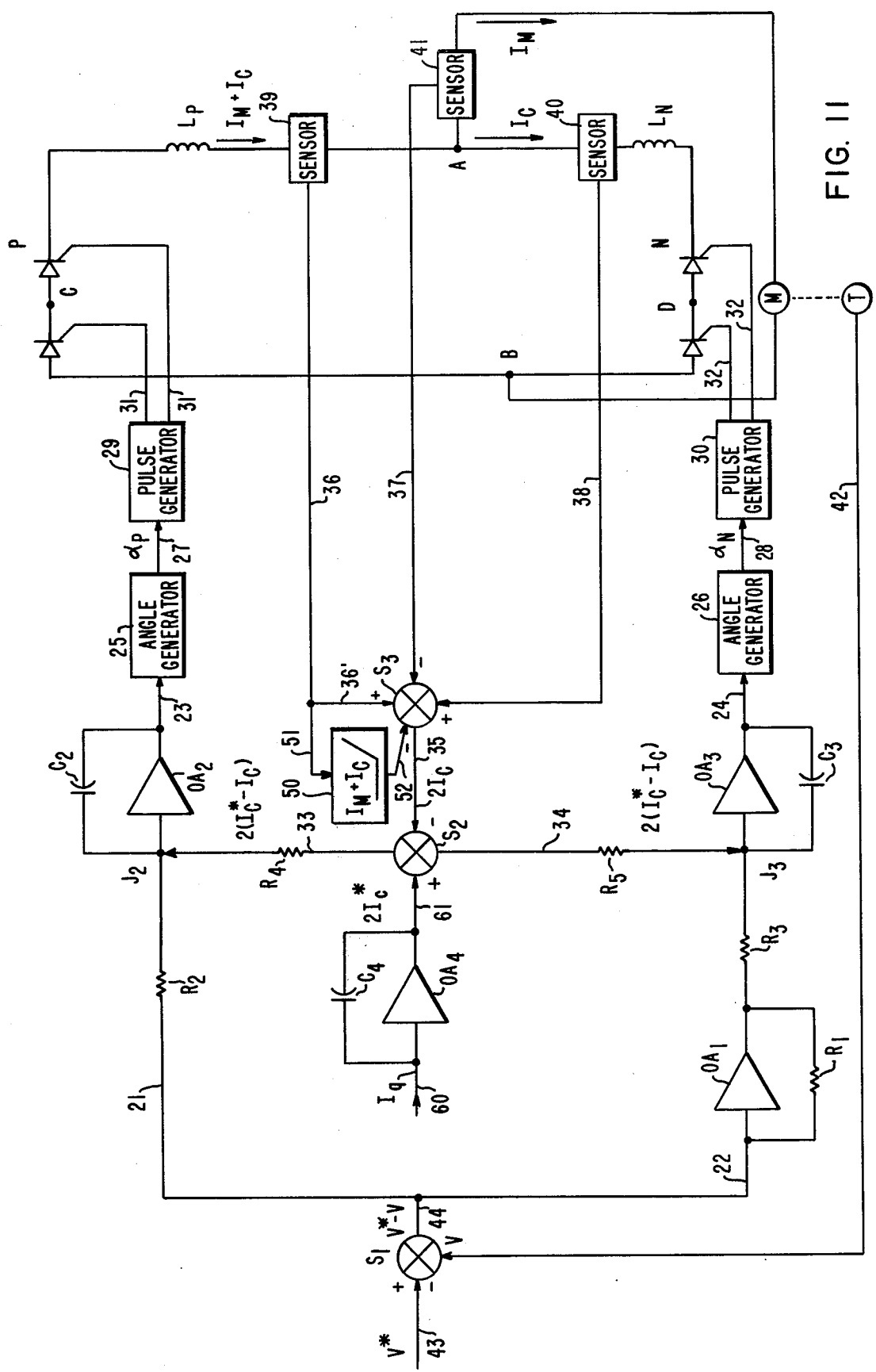
FIG. 11 shows in detail the circulation current control circuit of FIG. 1.

Referring now to FIG. 11, the control circuit for establishing the circulating current by control of the firing angles $\alpha_P$, $\alpha_N$ of the two converters is schematically represented by two channels associated with converters P and N, respectively. In the absence of a circulating current, these two channels are symmetrically operated and control the thyristors of the dual converter according to characteristics $(C_P)$ and $(C_N)$ of FIG. 10.

The speed of motor M is translated by a tachometer T into a voltage signal V applied on line 42 to a summing point S, which also receives to a speed reference signal V* from line 43. The output signal V* − V on line 44 is applied to both control channels on respective lines 21 and 22. The positive channel includes an operational amplifier OA$_2$ mounted as an integrator (feedback capacitor C$_2$) and an angle generator 25 generating a control pulse at angle $\alpha_p$.

The negative channel includes an operational amplifier OA$_1$ mounted as an inverting device in order to reproduce the mirror image function at the input of an operational amplifier OA$_3$ identical to OA$_2$, and an angle generator 26 identical to 25 to generate a control pulse at angle $\alpha_N$. OA$_3$ is also mounted as an integrator (capacitor C$_3$). The control pulses provided by angle generators 25, 26 are amplified and shaped by two identical pulse generators 29, 30 for the respective converters P and N, the thyristors of which are fired at firing angles $\alpha_P$ and $\alpha_N$ from respective lines 31 and 32. The unbalancing of the two channels to create a controlled circulating current $I_C$ is commanded by circulating current reference signal I*$_C$. Assuming the positive converter P operates as a rectifier and the negative converter N operates as an inverter, the absolute value of the current $I_C + I_M$ flowing from the rectifier P is sensed at 39, while the absolute value of the current $I_M$ in the motor is sensed at 41, and the absolute value of the current $I_C$ flowing in the inverter N is sensed at 40, in the branches from the DC terminal A.

The values so derived are applied to a summing point S$_3$ from respective lines 36, 37 and 38 with the polarities as indicated whereby the output signal thereof is $(I_C + I_M) - I_M + I_C = 2I_C$. Summer $S_2$ compares the actual circulating current signal $2I_C$ with the reference signal $2I_C^*$, and two control signals of identical values are applied to the input of the operational amplifiers $OA_2$, $OA_3$ of the two channels via lines 33, 34 and resistors $R_4$, $R_5$ at junction points $J_2$, $J_3$. As a result of the integrating operation of amplifiers $OA_2$, $OA_3$, an equal increment V is added to the values inputted otherwise to angle generators 25, 26.

Figure 12:
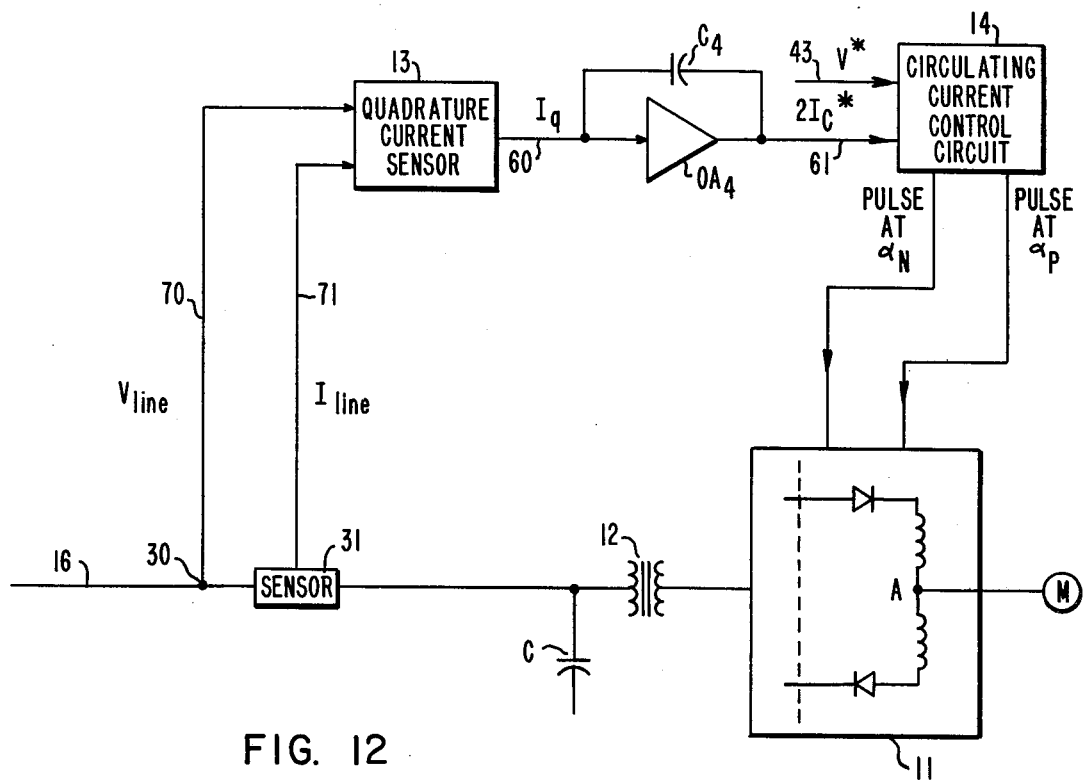
FIG. 12 illustrates diagrammatically how the quadrature current sensor of FIG. 1 is associated with the circulating current control circuit of FIG. 11.

The derivation of circulating current reference signal $2I_C^*$ will now be explained by reference to FIG. 12, representing the dual converter 11 with thyristors controlled by a circulation current control circuit 14 comprised of the control circuit of FIG. 11. The net quadrature current $I_q$ drawn from the AC network is detected by a quadrature current sensor 13 responsive to the line voltages and to the line currents sensed at 30 and 31, respectively in the input lines 16 to transformer 12. This net quadrature current $I_q$ component is the algebraic sum of the leading quadrature current drawn by capacitors C and the lagging quadrature current drawn by dual converter 11. The net quadrature current $I_q$ is the variable to be compensated by the loops comprising summer $S_2$, lines 33 and 34 and the associated positive and negative channels in FIG. 11. Due to the integrating effect of operational amplifier $OA_4$, a steady state in this loop is reached over $2I_C^*$ has established the circulating current necessary to reduce the net quadrature current signal $I_q$ to zero.

It is observed that while controlling the dual converter in accordance with the control teachings of FIGS. 10 and 11, e.g., while increasing vectors $I_{ac2}$ and $I_{acN}$ of the vectorial diagram of FIG. 6, the effective current component $I_{acP}$ of converter P should not exceed the rating of the converter. In order to prevent this, a limiting circuit is provided, in accordance with the present invention so that $(I_C + I_M)$ which is the larger current circulating in the converter operating as a rectifier, (see FIG. 11) does not exceed a given limit. To this effect, as shown in FIG. 11, the current magnitude sensed at point 39 is applied via lines 36, 51 to a non-linear function generator 50 which is capable of applying via line 52 with the proper polarity to summer 53 an overriding control signal operating as a limiter for the outputted signal $2I_C$. This feature is particularly important where the dual converter motor drive of FIG. 1 is applied together with other parallel loads drawing lagging quadrature currents from the AC line. This will appear more clearly from the following description of the invention given by reference to FIG. 13.

Figure 14:
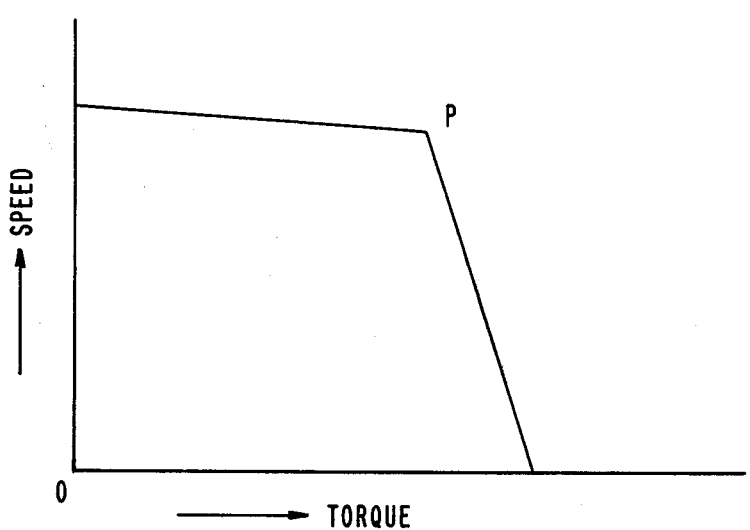
FIG. 14 illustrates the torque-speed response typical of a hoist motor drive.
Figure 13:
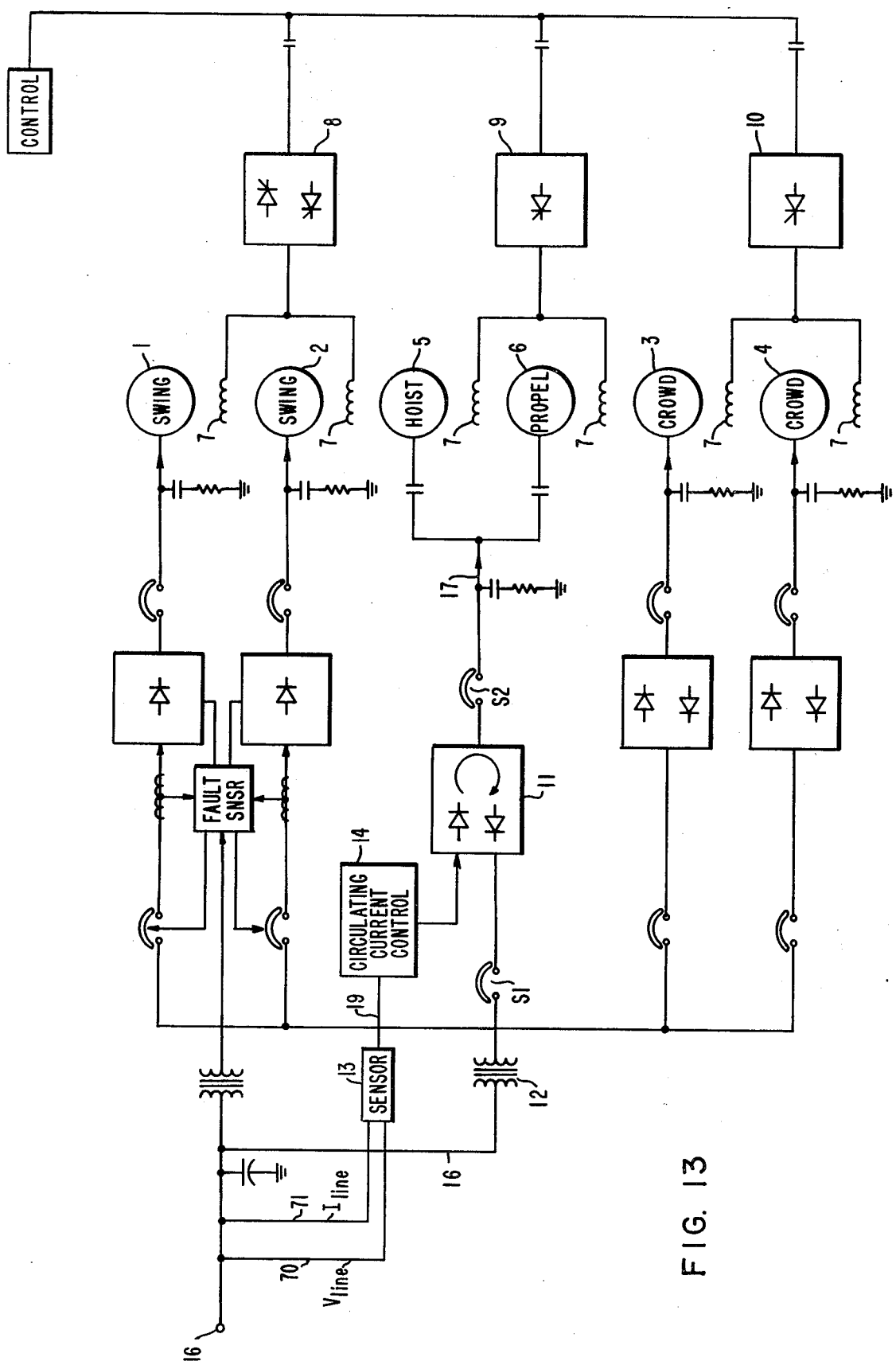
FIG. 13 shows the dual converter motor drive according to the present invention mounted in parallel with other static converters and used to correct the line power factor in relation to all such loads at the same time.

FIG. 13 typically shows the invention applied to a shovel equipment. The hoist and propel DC motors have their armature currents supplied from a dual converter 11 connected between a power transformer 12 and the DC motors 5 and 6. Transformer 12 has a three-phase primary connected via lines 16 to the three-phase alternating current power lines. The secondary is connected to one end of the two banks of thyristors of the dual converter via an interrupter $S_1$. The opposite end of the dual converter 11 is connected to the armatures of motors 3, 5 via three-phase lines 17 and through an interrupter $S_2$. Firing circuit 15 determines the firing angles of the thyristors of the two banks of dual converter 11. Fixed capacitors C are connected with three-phase lines 16 at the entry of the primary of transformer 12, thereby introducing additional reactive power in parallel to the dual converter 11. A quadrature current sensor 13 detects the quadrature component drawn from the AC supply, and a circulating current control circuit 14 generates a control signal on line 19 inputted to the firing circuit as explained earlier. A line voltage sensor circuit 20 is also inputted to the quadrature current sensor 13. The hoist system of FIG. 13 is typical of the field of application of the present invention. The usefulness of a dual converter motor drive according to the invention is best illustrated with excavator motor drives. In such case, the motors have to run in both directions either in the motoring or the overhauling mode; in other words, they have to operate in all four quadrants of their speed/torque and voltage/current characteristics. Moreover, specific attention has to be given to the shaping of the speed/torque curves. For the hoist, crowd, and propel motions, the objective is to control the speed to a desired level as quickly as possible and to run at that speed virtually independent of torque load up to a critical torque level, which is determined by the maximum motor capacity (see FIG. 14). Once that critical torque is reached, the speed is to fall rapidly with any further increase in torque, the responsive curve being such that no permanent damage will occur to the motor due to overload. In this manner, the excavator operator can operate the equipment at its point of maximum productivity (P in FIG. 14) with relative ease, by moving it as fast as possible for any given load until the machine slows down noticeably. At this point, the operator reacts quite naturally by letting off on speed or load, or both, to force the drive back to the knee in the speed/torque characteristic. The productivity of the excavator can be optimized if the motor drive can approach the limits of safe motor operation over the entire speed/torque characteristic. The flexibility of static drive controls provides a large degree of freedom in that respect.

Another important requirement in excavator motor drive performance is the need to avoid extraneous forces, such as cogging and torque modulation, particularly at low speeds. The combination of extremely large inertias to be moved, together with the need of uninterrupted service 24 hours a day over a period of many years makes the elimination of any unnecessary wear and tear mandatory.

Moreover, mining operations often occur at remote sites with the effect that the available electric power sources have limited quality. Since some excavators consume at such locations an amount of power equivalent to the entire need of a small town, the motor drive must be designed in function of the quality of the available power supply and the effect of the load thereon. In particular, the drive should have a good power factor, preferably with 0.9 as a minimum average.

Power factor is important not only for its effect on the feeder utility, but also for the system cost of the mining operation. Trail cables of up to 5 miles are generally used. A poor power factor would require oversizing of the cable. Since the cable is to be replaced about once a year, the power factor affects the cost substantially, Feeder line voltage variations are another item which enter into the front end design effort of the motor drive. Plus and minus 10% variations are common, and the equipment has to operate to its specified performance levels over this voltage range. Voltage dips of 20% must be accepted by the equipment without damage and without loss of a controlled motoring, braking, and shutdown capability. This is another reason why a dual converter motor drive is desirable in such application.

I claim:

1. In a dual converter motor drive including at least two semiconductor controlled rectifier banks connected between an alternating current power source and a reversible direct current motor, said rectifier banks being connected in reverse parallel connection between the terminals of said direct current motor, and means for extablishing a first firing angle in one of said rectifier banks to control said direct current motor under predetermined torque and speed conditions in one of two opposite directions of rotation, the combination of:

means for sensing the lagging quadrature component of the total current drawn by said rectifier banks from said AC source;

means for establishing in the other of said rectifier banks a second firing angle, said second firing angle being the supplementary of said first firing angle; and means responsive to said sensing means for modifying said first and second firing angles in two opposite directions and for causing a circulating direct current to be passed between said rectifier banks, the magnitude of said circulating direct current being in relation to a desired magnitude of said lagging quadrature component of current;

whereby the effect of said direct current motor on said sensed lagging quadrature current component is minimized.

2. The dual converter of claim 1, with capacitor means coupled to said alternating current power source for drawing a predetermined leading quadrature component of current, said lagging quadrature component of current being maintained by said circulating direct current causing means equal in magnitude to the magnitude of said predetermined leading quadrature current component.

3. The dual converter of claim 2 with said circulating direct current causing means comprising first means for sensing the current flowing into one of said banks, second means for sensing the current flowing in said motor and third means for sensing current flowing into the other of said banks; said first, second and third means being combined to derive a signal representative of said circulating direct current.

4. The dual converter of claim 3 with said circulating direct current causing means being responsive to said circulating current representative signal for altering the firing angle of said positive and negative banks to adjust the circulating current in relation to said leading quadrature component.

5. The dual converter of claim 1, with at least one additional load coupled to said alternating current source for drawing an additional lagging quadrature component of current from said source, said circulating direct current causing means being operable in relation to the combined effects of said direct current load and said additional load on said sensed quadrature current component.

6. The dual converter of claim 5 wherein means is provided for limiting the operation of said circulating direct current causing means in relation to predetermined rating of said dual converter.

* * * * *